(12) United States Patent
Nano et al.

(10) Patent No.: US 9,749,430 B2
(45) Date of Patent: Aug. 29, 2017

(54) SCALABLE DATA ENRICHMENT FOR CLOUD STREAMING ANALYTICS

(71) Applicant: Microsoft Corporation, Redmond, WA (US)

(72) Inventors: Olivier Nano, Aachen (DE); Ivo José Garcia dos Santos, Stolberg (DE); Eldar Akchurin, Aachen (DE); Tihomir Tarnavski, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 13/887,772

(22) Filed: May 6, 2013

(65) Prior Publication Data

US 2014/0330926 A1    Nov. 6, 2014

(51) Int. Cl.
*G06F 15/16* (2006.01)
*H04L 29/08* (2006.01)
*H04L 12/24* (2006.01)

(52) U.S. Cl.
CPC .............. *H04L 67/22* (2013.01); *H04L 41/14* (2013.01); *H04L 67/10* (2013.01)

(58) Field of Classification Search
CPC ....................................................... H04L 29/08
USPC ................................................. 709/201, 217
See application file for complete search history.

(56) References Cited

U.S. PATENT DOCUMENTS

| 2009/0125550 | A1 | 5/2009 | Barga et al. |
| 2009/0125635 | A1 | 5/2009 | Barga et al. |
| 2009/0287814 | A1 | 11/2009 | Robertson et al. |
| 2011/0093866 | A1 | 4/2011 | Grabs et al. |
| 2012/0130940 | A1 | 5/2012 | Gattani et al. |
| 2012/0310558 | A1* | 12/2012 | Taft ................................. 702/61 |
| 2013/0132967 | A1* | 5/2013 | Soundararajan et al. .... 718/104 |

OTHER PUBLICATIONS

Karr et al; "Nodeable Bolster Hadoop With StreamReduce Analytics Engine for Real-Time Data Insights and Faster Batch Processing"; Jul. 18, 2012; http://www.marketwired.com/press-release/nodeable-bolsters-hadoop-with-streamreduce-analytics-for-rea-time-data-insights-and-faster-batch-processing; pp. 1-2.*
Kreps et al; Kafka: A Distributed Messaging System for Log Processing; Jun. 12, 2011; pp. 1-7.*
Fischer, et al., "Real-Time Visual Analytics for Event Data Streams", In Proceedings of 27th Symposium on Applied Computing, Mar. 26, 2012, 6 pages.

(Continued)

*Primary Examiner* — Glenford Madamba
(74) *Attorney, Agent, or Firm* — Medley, Behrens & Lewis, LLC

(57) ABSTRACT

A method is described of pre-processing real-time data to be processed by one or more real-time analytics services. The method includes: receiving, at a stateless ingress node, data from one or more client devices; transforming the data in real-time at the stateless ingress node; determining in real-time, at the stateless ingress node, a real-time analytics service for the transformed data; and forwarding in real-time the transformed data to the determined real-time analytics service for stateful processing.

19 Claims, 4 Drawing Sheets

(56) References Cited

OTHER PUBLICATIONS

"Nodeable Bolsters Hadoop With Stream Reduce Analytics Engine for Real-Time Data Insights and Faster Batch Processing", Published on: Jul. 18, 2012, Available at: http://blog.nodeable.com/2012/07/18/nodeable-bolsters-hadoop-with-streamreduce-analytics-engine-for-real-time-data-insights-and-faster-batch-processing/.
Gasper, Tim, "Next Gen Real-time Streaming with Storm-Kafka Integration", Published on: Oct. 30, 2012, Available at: http://blog.infochimps.com/2012/10/30/next-gen-real-time-streaming-storm-kafka-integration/.
Ari, et al., "Data Stream Analytics and Mining in the Cloud", In IEEE 4th International Conference on Cloud Computing Technology and Science, Dec. 3, 2012, 6 pages.
"The Real-time Big Data Analytics Platform", Published on: Jun. 3, 2010, Available at: http://www.parstream.com/en/big_data_analytics_product/oneplatform/oneplatform.html.
Kreps, et al., "Kafka: a Distributed Messaging System for Log Processing", NetDB 2011: 6th Workshop on Networking meets Databases, Jun. 12, 2011, 7 Pages.

\* cited by examiner

SCALABLE DATA ENRICHMENT FOR CLOUD STREAMING ANALYTICS

BACKGROUND

As the world becomes more interconnected, digitized, and globalized, service providers are facing an enormous surge in traffic that will continue to grow exponentially. In the face of exploding data volumes and shrinking decision time windows, service providers have to make key business decisions in real-time to remain competitive. Not only in business but also in many science and engineering fields, fast insight into complex processes is needed. In telemetry, data is collected from distributed sources and transmitted to central aggregation points for monitoring, management and data analytics purposes. Telemetry applications range from meteorology, oil and gas industry, traffic surveillance, space industry, to motor racing and agriculture. In these applications, real-time analytics is helpful since it allows to immediately and continuously monitor effects that certain changes entail and to react in time when needed. Gathering real-time insight from data generated across distributed systems provides significant benefits for businesses by being able to react faster to changes and customer demands. In addition, devices (typically the edges of large distributed systems) are getting smarter and smarter and, correspondingly, able to produce more complex and larger volumes of data streams. Many connected devices scenarios benefit from gathering real-time insights: logistic, manufacturing, power utilities, telematics, data center monitoring, etc. Unfortunately, current tools and technologies designed to aid decision-making can no longer meet their needs. These tools require data to be recorded on a storage device, followed by offline analytic processing, to detect actionable insights. This is a time-consuming process and the real-time aspect often gets lost.

The problem arises of efficiently gathering data streams from devices to enable genuine real-time analytics of all these data streams in a cloud environment.

Previous solutions have relied on (persistently) storing data first and only then performing the analytics. For some scenarios this introduces unacceptable latency.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

It is proposed to pre-process incoming data in real-time before it is processed by a real-time analytics service. Client devices collect real-time data, which is received at one or more stateless ingress nodes which are, for example, located at a cloud environment or on-premises back-end system. The stateless ingress nodes transform the incoming data in real-time, for example by enriching it with additional data available only on the server side. Then, the ingress node determines an appropriate real-time analytics service for the transformed data. After that, the transformed data is forwarded to the appropriate real-time analytics service for stateful processing.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of computing systems.

Figure 1:
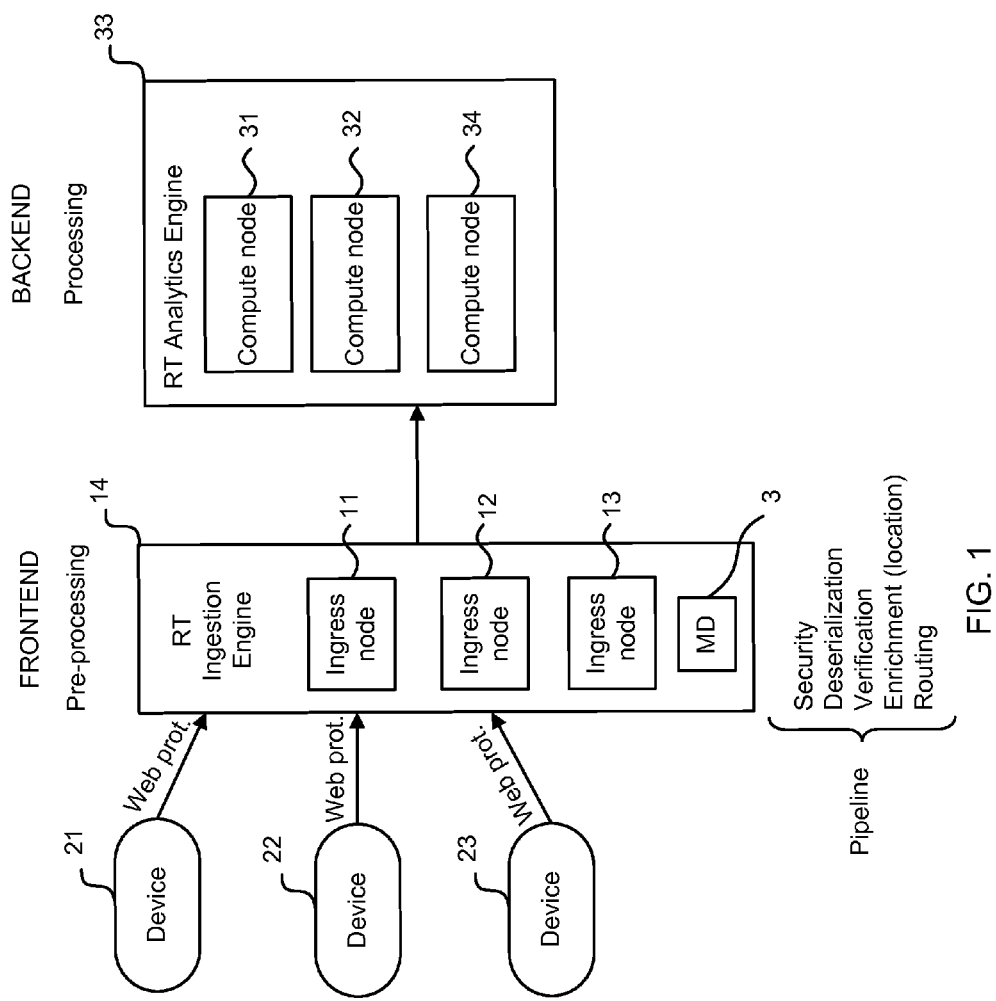
FIG. 1 illustrates a high-level architecture on which an example of a method of pre-processing real-time data to be processed by one or more real-time analytics services is performed.

FIG. 1 illustrates a high-level architecture on which an example of a method of pre-processing data is performed. Before proceeding further with the detailed description of FIG. 1, however, a few items of the embodiments will be discussed.

A first aspect refers to a method of pre-processing real-time data to be processed by one or more real-time analytics services. The method includes receiving, at a stateless ingress node, data from one or more client devices; transforming the data in real-time at the stateless ingress node; determining in real-time, at the stateless ingress node, a real-time analytics service for the transformed data; and forwarding in real-time the transformed data to the determined real-time analytics service for stateful processing.

A definition of "state" is used in some computer programs that operate serially (sequentially) on streams of data, such as in the method described herein. In some of these programs, the history of previous data inputs affects the processing of current input. That is the program can be modeled as a state machine. These programs are described as "stateful", and variables which contain values from the previous processing cycle are called the state. In other serial programs the output only depends on the current input; these are called "stateless".

In some of the embodiments, the ingress node is part of a scalable ingress layer.

In some of the embodiments the client devices are devices that collect real-time data. In some of these embodiments, the client devices are devices in vehicles that collect data of speed, temperature, etc. In other embodiments, the devices are mobile telephones that collect data regarding their location, reception/transmission quality, etc.

In some of the embodiments, a "node" is a physical network node (e.g. a computer system) which is an active electronic device that is attached to a network, and is capable of sending, receiving, or forwarding information over a communications channel, while in other embodiments, a node is a virtual machine (typically in a cloud computing environment) of a data center. In some of the embodiments, some of the nodes are "ingress nodes" which received data and perform pre-processing as a front-end service, while other nodes are "compute nodes" which perform the stateful processing, in the sense of the real-time analytics, as a back-end service. Embodiments of the method described herein rely on the insight that stateless pre-processing is performed at the ingress nodes at a front-end, while stateful processing is performed at the compute nodes at the back-end. In other words, stateless pre-processing is separated from stateful real-time analytics to achieve a real-time analysis of the incoming data.

The term "real-time", as used herein, refers to the delay introduced, by automated data processing or network transmission, between the occurrence of an event and the use of the processed data, such as for display and control purposes. For example, a near-real-time display depicts an event or situation as it existed at the current time minus the processing time, as nearly the time of the live event. The term "real-time" as used herein also encompasses the term "near real-time". Both terms imply that there are no significant delays. Also the term "in-flight" means that there is no significant delay. In some of the embodiments, the real-time aspect is achieved by avoiding any intermediate/temporary storage outside the main storage which typically leads to delays in the processing.

The term "real-time data" means data which has just been collected (e.g. refers to a measurement that has just been made). Real-time data relates to a point of time when it was generated or measured. If there are many devices who collect real-time data and a user wishes to get an overview of the current situation, then the real-time data have to be analyzed in real-time to be able to answer a user's query regarding a current or very recent point of time. If the data is not analyzed instantaneously, it loses its value for a user sending a query to a real-time analytics engine. The longer the data is not analyzed, the more the answer of the query refers to a past situation and the less value it has for a user. In some of the embodiments, the real-time data are telemetry data. Telemetry is the highly automated communications process by which measurements and/or other data are collected at typically remote or inaccessible points and transmitted to receiving equipment for monitoring.

The term "real-time analytics service" is any kind of service that processes (analyses) the received data in order to be able to answer a query. In some of the embodiments, the real-time analytics services aggregate the received data to get insight into the dynamics of the overall process that is currently monitored. In some of the embodiments, the real-time analytics services make a statistical analysis of the received data.

The term "ingress node", as used herein, refers to a node whose responsibility is to collect data from the devices and perform data transformations, while the term "compute node", as used herein, refers to a node whose responsibility is to perform stateful data analysis (aggregations, joins, etc.). In some of the embodiments, the data is collected from a wide variety of (different) client devices. In some of the embodiments, data ingress features are based on HTTP connections. Clients publish to well-known URI using standard HTTP verbs (GET, PUT, and POST). They may also leverage standard HTTP security techniques (such as HTTPS, or SSL over HTTP). In the embodiments, it is the task of the ingress node to transform (transcode) the incoming data since (data collecting) client devices may encode data using a well-known format or may provide their own customized format. In some of the embodiments, the Transmission Control Protocol (TCP) is used as a communications protocol.

The ingress nodes together form a (real-time) scalable front-end service to the real-time analytics services. The front-end is responsible for collecting input in various forms from the user and pre-processing it to conform to a specification the back-end can use. Hence, the front-end is an interface between the data-collecting devices or user and the back end. In the embodiments described herein, the back-end performs the stateful processing of the data (i.e. real-time analytics). While all stateless pre-processing can be done on the front-end in a scalable manner, the front-end is not just for data collection.

The term "virtual machine", as used herein in the context of cloud computing, means a software program or operating system that not only exhibits the behavior of a separate computer, but is also capable of performing tasks such as running applications and programs like a separate computer. A virtual machine, usually known as a guest is created within another computing environment referred as a "host". Multiple virtual machines can exist within a single host at one time. A virtual machine is also known as a guest. Isolation ensures that applications and services that run within a virtual machine cannot interfere with the host operating system or other virtual machines. Virtual machines are implemented by software emulation methods or hardware virtualization techniques. A system virtual machine is a system platform that supports the sharing of the host computer's physical resources between multiple virtual machines, each running with its own copy of the operating system. Virtual machines allow an efficient use of hardware.

Some embodiments pertain to the field of "cloud computing" which, according to one definition, is the use of computing resources (hardware and software) that are delivered as a service over a network (typically the Internet). End users access cloud-based applications for example through a web browser while the business software and user's data are typically stored on servers at a remote location at a data center (e.g. "cloud storage").

In some of the embodiments, the data is received in the form of one or more incoming data or event streams. A stream is sequence of data elements made available over time.

In some of the embodiments, the ingress node is responsible for handling the network connections from the client devices. In some of the embodiments, the ingress node and the client device communicate via request-response protocol. In some of these embodiments, the protocol is the Hypertext Transfer Protocol (HTTP).

As mentioned above, it is determined within the ingress node where a received data item is to be processed in the real-time analytics engine. To this end, incoming data is examined in real-time, e.g. it is examined where the data item stems from, e.g. via the data contained in the data item. Then, a lookup is made in a routing table and a destination, e.g. a compute node in the real-time analytics engine, is determined for the data item. In some of the embodiments, the routing table is part of a metadata storage. The data is transformed and is then dispatched in order not to lose any time directly to the compute node with the appropriate real-time analytics service. The routing of the logical data stream to the appropriate compute node that has to process it is based on the information in the routing table. In some of the embodiments, the routing table contains a mapping of a stream name to the address of the compute node responsible for this stream processing. In some of the embodiments, the routing table is part of the ingress node, while in other embodiments, the routing table is stored external to the ingress node. In some of the embodiments, the routing table is stored in main memory or in a distribute cache.

In some of the embodiments, transformation of data includes performing security operations. In some of the embodiments, security checks are performed to confirm if the data item proceeds from an authorized data source. In other embodiments, the user could also do data integrity checks based, for example, on checksums.

In some of the embodiments, the ingress node performs verification which means that it checks whether the data comes from an indicated, reliable source. In some of the embodiments, the ingress node performs location enrichment. The ingress node adds geo-location information to the data item by looking at the originating IP address and looking it up in a geo-resolution database, which maps IP addresses to geo-locations.

In the context of data storage and transmission, serialization is the process of translating data into a format that can be stored (for example, in a file or memory buffer, or transmitted across a network connection link) and "resurrected" later in the same or another computer environment. When the resulting series of bits is reread according to the serialization format, it can be used to create a semantically identical clone of the original object. The opposite operation, extracting a data structure from a series of bytes, is deserialization. In other embodiments, the transformation includes performing deserialization. The term "deserialization" as used herein refers to the extraction of data stored in a certain format from that format. For example, deserialization refers to the process of transforming received messages (possibly in a user's customized format) into events.

In some of the embodiments, the forwarding the data to the determined real-time analytics service includes serializing the data. Deserialization and subsequent serialization are performed with an event pipeline engine.

In some of the embodiments, the method includes spooling and replaying the received data. In computer science, Spool is an acronym for simultaneous peripheral operations on-line. With spooling, multiple processes can send data to a queue without waiting. As soon as a process has sent its data to the spool device, the process can perform other tasks, while a separate process further processed the received data. In some of the embodiments, the (raw) data is spooled in a distributed data store through an efficient batching and partitioning mechanism. "Replay" is the opposite operation, when data that has been previously "spooled" is sent back to the ingress or compute nodes and flows again through the data processing pipeline.

In some of the embodiments, the client devices are distributed systems. In some of these embodiments, the client devices are mobile telephones, sensors of a sensor network or simply distributed mobile computers.

In some of the embodiments, an ingress node includes one or more listeners, one or more dispatchers, an event pipeline engine and a transport component. These components will be explained in more detail in FIG. 3.

In some of the embodiments, the data is received at a plurality of ingress nodes and a load balancer is provided in front of the ingress nodes to balance the incoming data over the ingress nodes. Load balancing is a computer networking method to distribute workload across multiple computers or a computer cluster, network links, central processing units, disk drives, or other resources, to achieve optimal resource utilization, maximize throughput, minimize response time, and avoid overload. Using multiple components with load balancing, instead of a single component, may increase reliability through redundancy.

In some of the embodiments, the data is received at a plurality of ingress nodes and the number of currently deployed ingress nodes can be changed at runtime by a user or depending on the load. This enables the dynamic support for ingress nodes joining and leaving the network. It also enables scalability of the method described herein. If the currently deployed ingress nodes cannot pre-process the data in-flight, additional ingress nodes can be added.

In some of the embodiments, the stateless ingress nodes are identical and independent, while the compute nodes perform stateful real-time data analytics (aggregations, joins, etc).

In some of the embodiments, the processing is performed by a number of compute nodes. In some of these embodiments, the number of currently deployed compute nodes can be dynamically changed at runtime by a user.

In some of the embodiments, the data is only stored in a main memory and pre-processed from the main memory (primary storage) during the pre-processing method. That means that the data is not recorded in an (external) storage (secondary storage: mass storage device, tertiary storage: removable media such as CDs and DVDs) before it is analyzed. Access to these sorts of storages is slow and causes delay and loss of the real-time aspect.

A second aspect relates to one or more computer-readable media comprising computer-executable instructions stored thereon which, when executed by one or more processors, cause the one or more processors to perform a method of pre-processing real-time data to be processed by one or more real-time analytics services. The method includes receiving, at a stateless ingress node, data from one or more data collecting devices; transforming the data in real-time at the stateless ingress node; determining in real-time, at the stateless ingress node, a real-time analytics service for the transformed data; and forwarding in real-time the transformed data to the determined real-time analytics service for stateful processing.

A third aspect relates to a stateless ingress node of a front-end service, wherein the stateless ingress node is arranged to perform a method of stateless pre-processing real-time data to be processed by one or more real-time analytics services. The stateless pre-processing includes receiving data from one or more data collecting devices; transforming the data in real-time; determining in real-time a real-time analytics service for the transformed data by using a routing table; and forwarding in real-time the transformed data to the determined real-time analytics service for stateful processing.

While individual features of embodiments have explained separately above, it is clear that the features can be combined within one embodiment.

Returning now to FIG. 1, which shows a high-level architecture of an environment in which a method of pre-processing real-time data is performed. FIG. 1 shows a real-time ingestion engine 14 which performs pre-processing as a front-end service before the real-time data is processed in a real-time analytics engine 33. Data collecting devices 21 collect real-time data, such as speed data of vehicles that are currently circulating in a city. In the example shown, a pool 14 of ingress nodes, which forms the real-time ingestion engine, contains three ingress nodes 11, 12, 13 which are identical, stateless and independent of each other. The responsibility of the ingress nodes 11, 12, 13 is to collect real-time data from client devices 21, 22, 23 and perform data transformation. While FIG. 1 shows three ingress nodes 11, 12, 13, the pool 14 can contain an arbitrary number of ingress nodes 11, 12, 13 with a number of data endpoints. The number of currently deployed ingress nodes 11, 12, 13 can be changed at runtime by a user. Further ingress nodes can be added or ingress nodes can be removed depending on the current load. The architecture further shows a pool 33 of addressable compute nodes 31, 32, 34 which do the processing of the incoming data as a real-time analytics engine 33. It is one of the tasks of the ingress nodes 11, 12, 13 to determine an appropriate compute node (real-time analytics service) for the incoming data and forward the data to that compute node. To this end, the ingress nodes 11, 12, 13 have access to a metadata store 3 which contains a routing table that indicates which data have to be forwarded to which compute node 31, 32, 34.

Each ingress node 11, 12, 13 contains an event pipeline engine which performs tasks such as security checks, verification, (location) enrichment, deserialization, routing, transformations, schema changes, debatching and decompression.

Figure 2:
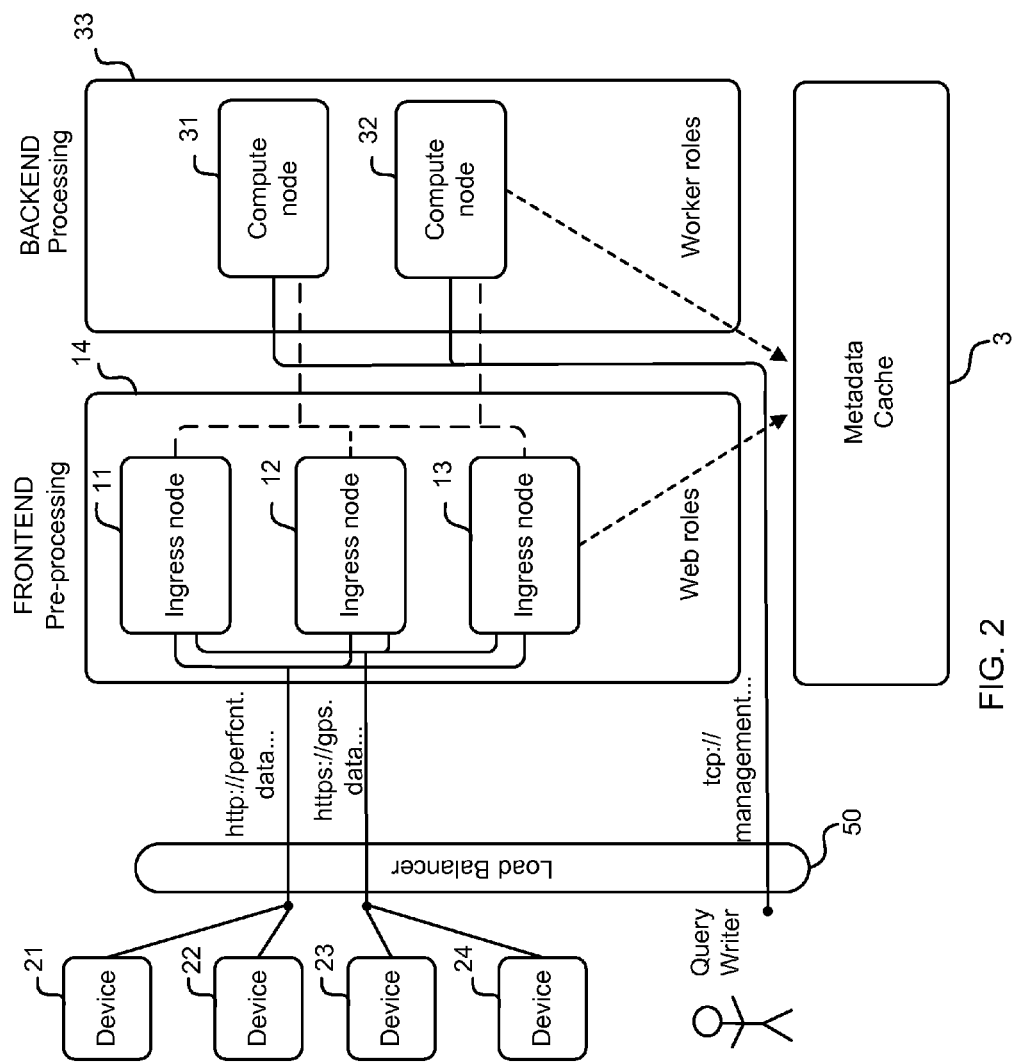
FIG. 2 illustrates another high-level architecture on which a method of pre-processing real-time data to be processed by one or more real-time analytics services is performed.

FIG. 2 shows another example of a high-level architecture of an environment in which a method of pre-processing real-time data is performed.

Each ingress node 11, 12, 13 has a predefined set of physical data endpoints which are exposed to the data collecting devices 21, 22, 23. In the example shown, each data endpoint supports a single protocol for communication (such HTTP, HTTPS, etc.). Data collecting devices 21, 22 collect real-time data and provide it to the data endpoint that is in charge of the Hypertext Transfer Protocol, while client devices 23, 24 collect their real-time data to provide it to the data endpoint that is in charge of the Hypertext Transfer Protocol Secure. Scalability is achieved by increasing the number of ingress nodes 11, 12, 13, not the number of endpoints. The only operation that will be supported by data endpoints is a push operation. (In other embodiments, a pull based model may also be implemented.) This is a generic operation to ingress event/batches of events in the system. A load balancer 50 is provided in front of the ingress nodes to balance the load of incoming data over the ingress nodes 11, 12, 13.

The high-level architecture shown in FIG. 2 monitors the speed of vehicles circulating in a city. In this example, the devices 21, 22, 23, 24 are data collecting entities that are located in the vehicles. A query writer asks: "Who are the hundred drivers who are driving the fastest now (or in the last five minutes)." The query is directly sent to the compute nodes 31, 32, where the query is parsed and analyzed. The result of the analysis is that is contains the words "drivers" and "fastest". From this analysis, the data types "driver" and "speed" can be derived by means of a metadata cache 3. In other embodiments, a user uses a well-defined query language to specify queries in the system so that no natural language processing needs to be done. The term "web role" as used in FIG. 2 refers to a front-end node while the term "worker role" refers to a back-end node.

Figure 3:
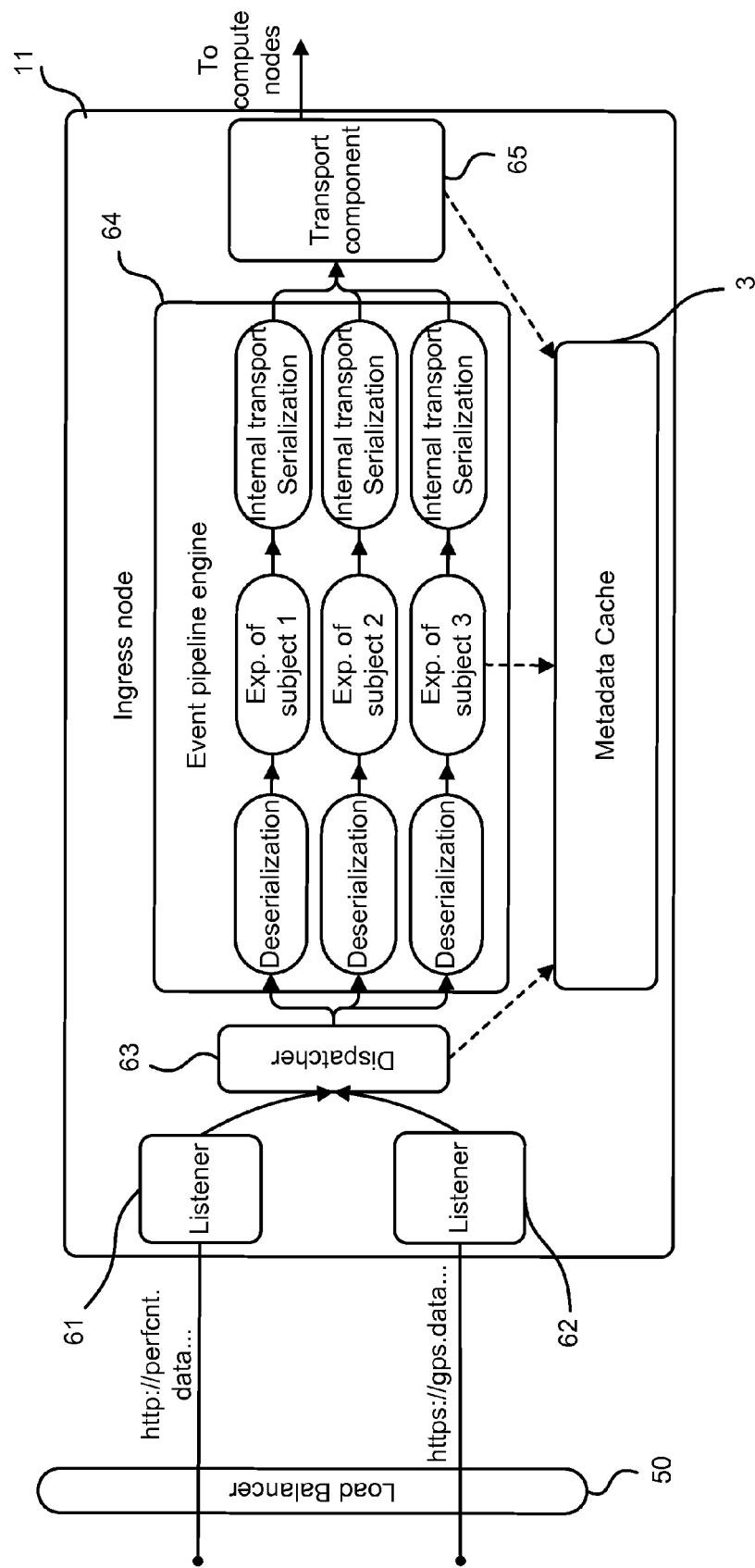
FIG. 3 illustrates a stateless ingress node in more detail.

FIG. 3 gives insight into the ingress node 11 in more detail which has two listeners 61, 62. At instance startup, a separate listener is created for each data endpoint. The information about the listener configuration depends on the endpoint it caters for and is taken from a metadata cache 3. After the startup, the listeners 61, 62 accept incoming connections on the data endpoint and take care of physical protocol specific details, such as security, connection handling, etc., so that a dispatcher, which is subscribed to the listeners 61, 62, does not depend on physical protocols and can deal only with received data. The responsibility of the listeners 61, 61 is to provide a protocol specific push or pull operation. The listeners 61, 62 take care of the protocol specific details such as security, but do not perform any transformation of the received data. Received events are opaque for the listeners 61, 62. They will simply pass the received raw bytes and associated operation context to the dispatcher 63. The operation context will include some additional information about the operation/connection, such as client IP address, whether the user was authenticated, etc.

The functionality of the dispatcher 63 is generic for different types of listeners and there is no state associated with the dispatcher 63, so that the one dispatcher 63 is sufficient for the ingress node 11. The dispatcher 63 is a passive object and dispatches incoming data to the event pipeline engine 64. The responsibility of the dispatcher 63 is to dispatch incoming data or requests to the appropriate event processing pipeline.

The event pipeline engine 64 creates a particular pipeline asynchronously from the data received at the listeners 61, 62 as soon as the information about it appears in the metadata cache 3. It is torn down when the metadata is deleted from the metadata cache 3. It is the responsibility of a pipeline to create payloads out of the network data received in the listeners 61, 62. After the processing through the pipelines is done, the payloads are handed over to transport component 65 and sent to the appropriate compute node. Within the event pipeline engine 64, a deserialization is performed, then certain expressions are extracted and provided to the metadata cache 3. Finally, a serialization is performed for internal transport. The "expression" of subject1, subject2 and subject3 is the actual definition of all data transformation steps that the user wants to perform in the ingress node 11.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units.

Figure 4:
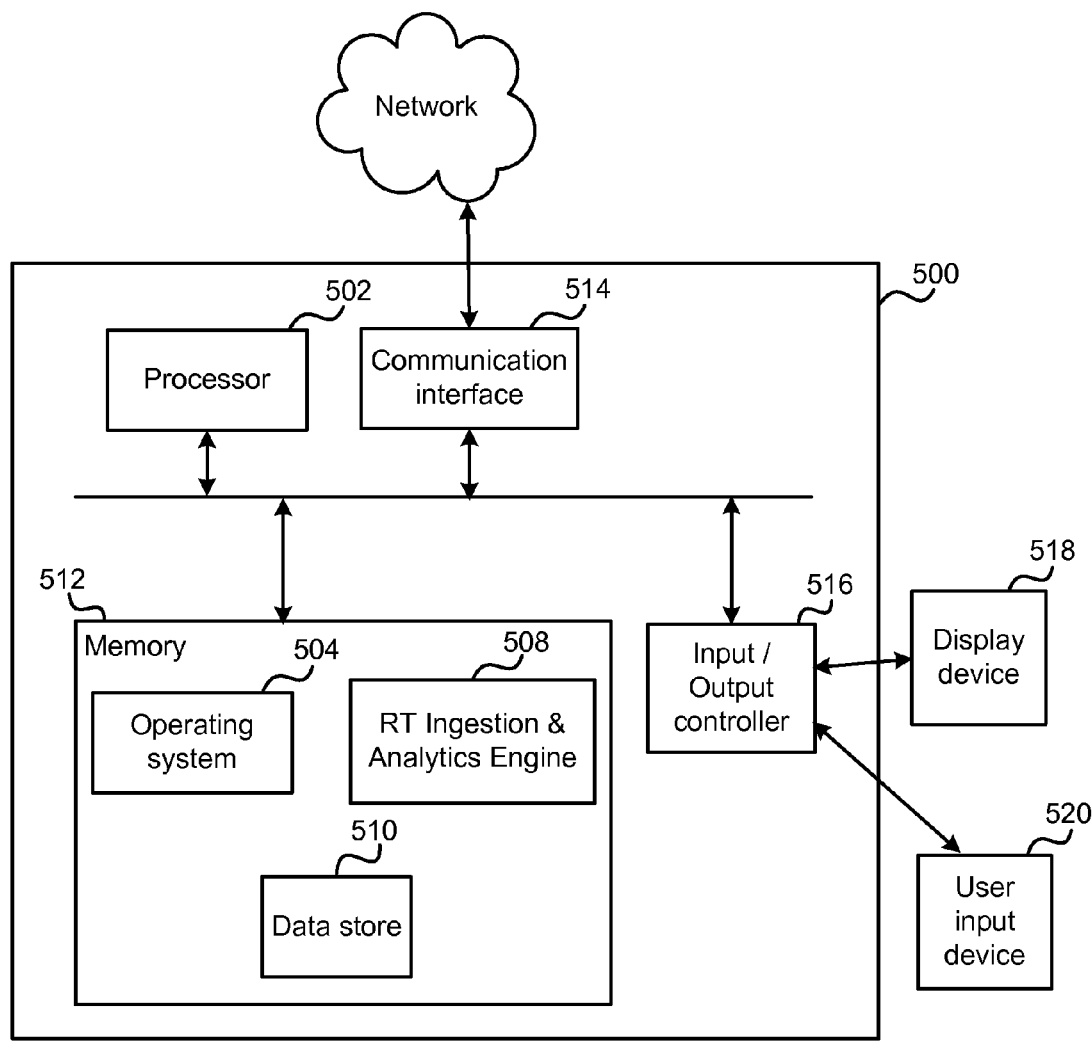
FIG. 4 illustrates an exemplary computing-based device in which embodiments of a method of pre-processing real-time data to be processed by one or more real-time analytics services may be implemented.

FIG. 4 illustrates various components of an exemplary computing-based device 500 which may be implemented as any form of a computing and/or electronic device, and in which embodiments of a method of downloading a file from an external source to each of a plurality of nodes of a data center may be implemented.

Computing-based device 500, which is one of the nodes within a data center to which a data item is downloaded, comprises one or more processors 502 which may be microprocessors, controllers or any other suitable type of processors for processing computer executable instructions to control the operation of the device in order to download a data item from an external source to each of a plurality of nodes. In some examples, for example where a system on a chip architecture is used, the processors 502 may include one or more fixed function blocks (also referred to as accelerators) which implement a part of the download method in hardware (rather than software or firmware). Platform software comprising an operating system 504 or any other suitable platform software may be provided at the computing-based device 500. A real-time ingestion engine, which does the pre-processing method as described herein, and a real-time analytics engine, which does the actual real-time analysis, are also provided. Moreover, a data store 510 is provided which may provide the metadata storage, other parameters or other information.

The computer executable instructions may be provided using any computer-readable media that is accessible by the computing-based device 500. Computer-readable media may include, for example, computer storage media such as memory 512 and communications media. Computer storage media, such as memory 512, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium is not to be interpreted to be a propagating signal per se. Propagated signals may be present in a computer storage media, but propagated signals per se are not examples of computer storage media.

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). In some examples the user input device 520 may detect voice input, user gestures or other user actions and may provide a natural user interface (NUI). This user input may be used to control the download method, to set parameter values, to view results and for other purposes. In an embodiment the display device 518 may also act as the user input device 520 if it is a touch sensitive display device. The input/output controller 516 may also output data to devices other than the display device, e.g. a locally connected printing device.

The input/output controller 516, display device 518 and optionally the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of pre-processing real-time data to be processed by one or more real-time analytics services, the method comprising:
   receiving, at a stateless ingress node, data from one or more client devices, the data provided from a load balancer in front of stateless ingress nodes to balance incoming data over the stateless ingress nodes, wherein the stateless ingress node comprises one or more listeners that receive the data from the load balancer;
   transforming the data in real-time at the stateless ingress node, wherein the stateless ingress node performs stateless pre-processing to output transformed data, and wherein the stateless pre-processing performed by the stateless ingress node is separate from stateful real-time analytics performed by the one or more real-time analytics services;
   determining in real-time, at the stateless ingress node, a real-time analytics service for the transformed data; and
   forwarding in real-time the transformed data to the determined real-time analytics service for performance of the stateful real-time analytics.

2. The method of claim 1, wherein the data is received in the form of one or more incoming data or event streams.

3. The method of claim 1, wherein the stateless ingress node is a virtual machine.

4. The method of claim 1, wherein the client devices are data collecting devices and the data is telemetry data.

5. The method of claim 1, wherein the stateless ingress node and the one or more client devices communicate via a request-response protocol.

6. The method of claim 1, wherein the stateless ingress node has a set of data endpoints and each data endpoint supports a single protocol for communication.

7. The method of claim 1, wherein the determining the real-time analytics service is performed, at the stateless ingress node, using a routing table stored in a metadata storage.

8. The method of claim 1, wherein the transformation comprises performing at least one of: security operations, deserialization, verification, location enrichment, data transformation, schema changes, debatching and decompression.

9. The method of claim 1, wherein forwarding the transformed data to the determined real-time analytics service comprises serializing the transformed data.

10. The method of claim 1, further comprising spooling, replaying and archiving the received data.

11. The method of claim 1, wherein the client devices are distributed systems.

12. The method of claim 1, wherein the stateless ingress node further comprises one or more dispatchers, an event pipeline engine and a transport component.

13. The method of claim 1, wherein a number of the stateless ingress nodes that are currently deployed is changed at runtime by a user or depending on a load.

14. The method of claim 1, where the stateless ingress nodes are identical and independent.

15. The method of claim 1, wherein the stateful real-time analytics are performed by a number of compute nodes.

16. The method of claim 15, wherein the number of the compute nodes that are currently deployed is changed at runtime by a user.

17. The method of claim 1, wherein the data is only stored in a main memory and pre-processed from the main memory during the stateless pre-processing.

18. One or more computer storage media for performing a method of pre-processing real-time data to be processed by one or more real-time analytics services comprising:
   computer-executable instructions to receive, at a stateless ingress node, data from one or more data collecting devices, the data provided from a load balancer in front of stateless ingress nodes to balance incoming data over the stateless ingress nodes, wherein the stateless ingress node comprises one or more listeners that receive the data from the load balancer;
   computer-executable instructions to transform the data in real-time at the stateless ingress node by performing stateless pre-processing at the stateless ingress node, and wherein the stateless pre-processing performed at the stateless ingress node is separate from stateful real-time analytics performed by the one or more real-time analytics services;
   computer-executable instructions to determine in real-time, at the stateless ingress node, a real-time analytics service for the transformed data; and
   computer-executable instructions to forward in real-time the transformed data to the determined real-time analytics service for performance of the stateful real-time analytics.

19. A stateless ingress node of a front-end service, wherein the stateless ingress node is arranged to perform a method of pre-processing real-time data to be processed by one or more real-time analytics services, the pre-processing comprising:
   receiving data from one or more data collecting devices, the data provided from a load Balancer in front of stateless ingress nodes to balance incoming data over the stateless ingress nodes, wherein the stateless ingress node comprises one or more listeners that receive the data from the load balancer;
transforming the data in real-time;
determining in real-time a real-time analytics service for the transformed data by using a routing table; and
forwarding in real-time the transformed data to the determined real-time analytics service for stateful processing.

* * * * *